United States Patent
Tanaka et al.

(10) Patent No.: US 6,919,923 B1
(45) Date of Patent: Jul. 19, 2005

(54) DIGITAL STILL CAMERA CAPABLE OF COMMUNICATING AUDIO AND IMAGE DATA TO/FROM A REMOTE SITE

(75) Inventors: Masahide Tanaka, Osaka (JP); Katsutoshi Ito, Tokyo (JP); In-seok Seo, Suwon-si (KR)

(73) Assignee: Samsung Techwin Co., Ltd., Suwon (KR)

( * ) Notice: Subject to any disclaimer, the term of this patent is extended or adjusted under 35 U.S.C. 154(b) by 0 days.

(21) Appl. No.: 09/026,336

(22) Filed: Feb. 19, 1998

(30) Foreign Application Priority Data

| Jun. 30, 1997 | (KR) | 97-29441 |
| Jun. 30, 1997 | (KR) | 97-29442 |
| Jun. 30, 1997 | (KR) | 97-29443 |

(51) Int. Cl.[7] .................... H04N 5/225; H04N 5/228
(52) U.S. Cl. .................. 348/220.1; 348/222.1; 348/552; 455/556
(58) Field of Search .................... 348/14.01, 14.02, 348/14.04, 14.12, 14.13, 14.14, 207.99, 207.1, 211.1, 211.2, 220.1, 231.99, 231.6–231.9, 375–376, 552; 358/906, 909.1; 386/95, 96, 102, 104, 107–109, 112, 113–115, 117; 455/556, 566, 575

(56) References Cited

U.S. PATENT DOCUMENTS

| 4,876,604 A | | 10/1989 | Nobuta .................... 358/400 |
| 5,164,831 A | * | 11/1992 | Kuchta .................... 348/231.7 |
| 5,384,070 A | | 1/1995 | Hemmerling et al. ......... 252/61 |
| 5,479,206 A | | 12/1995 | Ueno et al. .................. 348/211 |
| 5,491,507 A | * | 2/1996 | Umezawa ................ 348/14.02 |
| 5,539,455 A | | 7/1996 | Makioka .................... 348/222 |
| 5,584,070 A | | 12/1996 | Harris et al. |
| 5,684,716 A | * | 11/1997 | Freeman .................... 345/723 |
| 5,719,936 A | * | 2/1998 | Hillenmayer ................ 379/447 |
| 5,806,005 A | * | 9/1998 | Hull .......................... 348/14.12 |
| 5,825,408 A | * | 10/1998 | Yuyama .................... 348/14.01 |
| 5,910,815 A | * | 6/1999 | Boursier et al. ......... 348/14.01 |
| 6,009,336 A | * | 12/1999 | Harris ........................ 455/566 |
| 6,038,257 A | * | 3/2000 | Brusewitz ................ 348/14.14 |
| 6,073,034 A | * | 6/2000 | Jacobsen .................... 455/566 |
| 6,147,703 A | * | 11/2000 | Miller ........................ 348/552 |
| 6,177,950 B1 | * | 1/2001 | Robb ...................... 348/14.01 |
| 6,564,070 B1 | * | 5/2003 | Nagamine et al. ....... 455/556.1 |
| 6,690,417 B1 | * | 2/2004 | Yoshida et al. .......... 348/231.1 |

FOREIGN PATENT DOCUMENTS

| CN | 2253892 Y | 5/1997 | ............ H04M/1/02 |
| DE | 19528424 A1 | 8/1995 | ........... G06F/3/037 |

(Continued)

OTHER PUBLICATIONS

"Digital multimedia, simply genius" in: Brochure "The new PowerShot 600" of the company Canon Deutschland GmbH, Postfach 528, D–47705 Krefeld, 1996, received at the Systems, Munich 1996.

(Continued)

Primary Examiner—Ngoc-Yen Vu
(74) Attorney, Agent, or Firm—McGuireWoods LLP

(57) ABSTRACT

A digital still camera includes means for converting an optical image into a digital electromagnetic image signal, means for transmitting an electromagnetic to designate a remote device accessible in accordance with a wireless telephone system, means for receiving an electromagnetic signal containing an identification signal to be transmitted back from the remote device in response to the designation, means for modifying the electromagnetic signal into a digital electronic signal, means responsive to the receiving means for reducing the number of pixels of the still image, and means for transmitting the electromagnetic signal containing the still image signal to the designated remote device.

17 Claims, 5 Drawing Sheets

FOREIGN PATENT DOCUMENTS

| | | | | |
|---|---|---|---|---|
| EP | 0 614 305 A2 | 9/1994 | ............ | H04N/1/00 |
| EP | 0 675 648 A2 | 10/1995 | .......... | H04N/5/926 |
| JP | 6-133081 | 5/1994 | .......... | H04M/11/00 |
| JP | 6-268582 | 9/1994 | ............ | H04B/7/26 |
| JP | 07121147 A | 5/1995 | ............ | G09G/5/00 |
| JP | 08294030 A | 11/1996 | .......... | H04N/5/225 |

OTHER PUBLICATIONS

HTML file: "Your personal picture of CeBIT 97, taken with the Siemens Pictophone, Siemens PN KE TI, Siemens AG, Hofmannstr. 51, D–81359, three pages, contained on 3.5" floppy disc CEBIT Mar. 1997.

* cited by examiner

DIGITAL STILL CAMERA CAPABLE OF COMMUNICATING AUDIO AND IMAGE DATA TO/FROM A REMOTE SITE

BACKGROUND OF THE INVENTION (a) Field of the Invention

The present invention relates to a digital still camera which converts an optical image into a digital electronic signal representative of the image and stores the digital electronic signal, and more particularly to a digital still camera capable of communicating to a remote site by means of a wireless telephone system.

(b) Description of the Related Art

In the field of digital still cameras, various types of communication of digital electronic image signals have been proposed. One of the typical proposals is to transmit the digital electronic image signal to a remote device, such as a computer, by connecting a digital still camera to a wireless telephone through a MODEM, and transmitting the signal to the remote device that is connected to a telephone line.

Japanese Laid Open Patent Application Nos. 6-133081 and 6-268582 respectively disclose a digital still camera and a wireless telephone contained in a single housing. The purpose of combining the digital still camera and the wireless telephone in one inseparable housing is to conserve memory to store the digital electronic image signals. In other words, the digital electronic image signals are transmitted from the digital still camera to a computer at a remote site with a large memory.

Such digital image signals would otherwise have to be stored in a memory device included in the digital still camera itself. The device disclosed in Japanese Laid Open Patent Application NO. 6-133081 or No. 6-268582, which transmits image information taken by a digital still camera to a computer at a remote site, has disadvantages because the system is not able to receive image information from a remote site. Furthermore, the device is expensive and inconvenient because a large amount of memory is required and it takes long to transmit image pixel data per frame as it is or in compressed format.

SUMMARY OF THE INVENTION

An object of the present invention is to provide a digital still camera including in one inseparable housing a wireless telephone, which can receive and display a digital electronic image signal generated by another digital still camera.

Another object of the present invention is to provide a digital still camera which can receive and audio signal and an image signal and can communicate the audio and image signals simultaneously.

Another object of the present invention is to provide a digital still camera capable of telecommunication, in which a user can not only talk in the ordinary manner, but also may view a displayed still image.

A further object of the present invention is to provide a digital still camera which can communicate both audio and image signals simultaneously.

Another object of the present invention is to provide a digital camera which can communicate with various types of telephones including those having no capability of receiving an image signal.

Another object of the present invention is to provide A digital still camera which can efficiently communicate with digital still cameras.

Another object of the present invention is to provide a digital still camera which can communicate with various remote devices including a standard computer.

In order to obtain these objects, a digital still camera according to the present invention includes: means for converting an optical image into a digital image signals a device for transmitting an electromagnetic signal to a designated remote device connected to the wireless telephone system;

a device for receiving an electromagnetic signal containing an identification signal to be transmitted back from a specific type of remote device;

a device for modifying the electromagnetic signal into a digital image signal;

a device for reducing the number of pixels of the digital image signal to form a still image signal contained in the electromagnetic signal; and a device for transmitting the electromagnetic signal containing the still image signal to a designated remote device.

Other objects and various advantage according to the present invention will be better understood by means of the following detailed description of the preferred embodiment in conjunction with the attached drawing.

BRIEF DESCRIPTION OF THE DRAWINGS

The above objects and features of the present invention will be apparent from the following description of the preferred embodiment with reference to the accompanying drawings.

DETAILED DESCRIPTION OF THE PREFERRED EMBODIMENTS

The above objects and features of the present invention will be apparent from the following description of the preferred embodiments with reference to the accompanying drawings.

Figure 1:
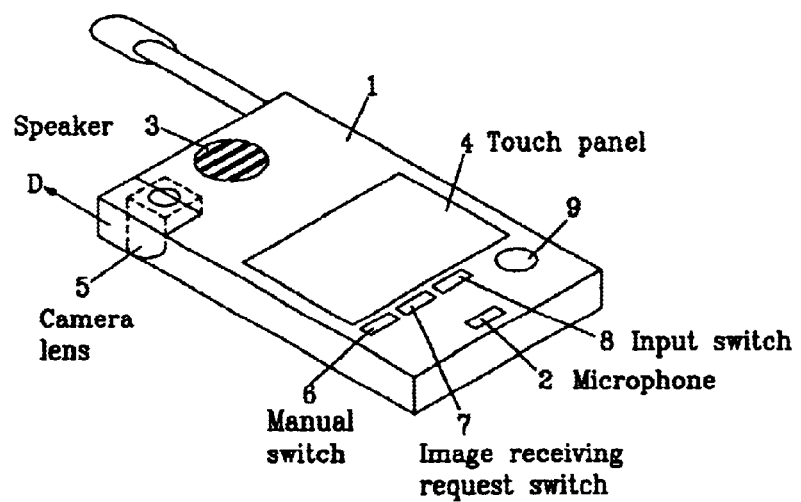
FIG. 1 represents a perspective view of an embodiment of a digital still camera according to the present invention.

As shown in FIG. 1, a digital still camera according to an embodiment of the present invention includes a microphone 2 and a speaker 3 in a single housing.

Further, the digital still camera includes a display device (color liquid crystal device) 4 of a reflection type without back light illumination to save electric power, which displays a color image of 60,000 pixels. A touch panel is formed to function as dial buttons for the digital telephone at the display device 4.

A camera lens 5 can rotate and is normally directed in the direction represented by arrow D. In other words, the camera lens 5 is normally directed toward an object located at a position where the display device 4 is not observable and is alternatively capable of being directed toward an object located at a position where display device 4 is observable as shown by the broken line in FIG. 1

The speaker 3 and the microphone 2 can function in a close mode or in a remote mode. In a close mode, the users put their ears and mouths close to the speaker 3 and microphone 2. In a remote mode, the users are relatively remote from the speaker 3 and the microphone 2.

A manual switch 6 activates the display device 4 "ON" to display a still image. The speaker 3 and the microphone 2 are automatically changed into a remote mode when the display device 4 is activated by the manual switch 6.

An image receiving request switch 7 is activated to request an image in manual mode. A pen input touch panel 4 is also formed to input an image by a pen when an input switch 8 is activated. The button 9 is a shutter release button.

Figure 2:
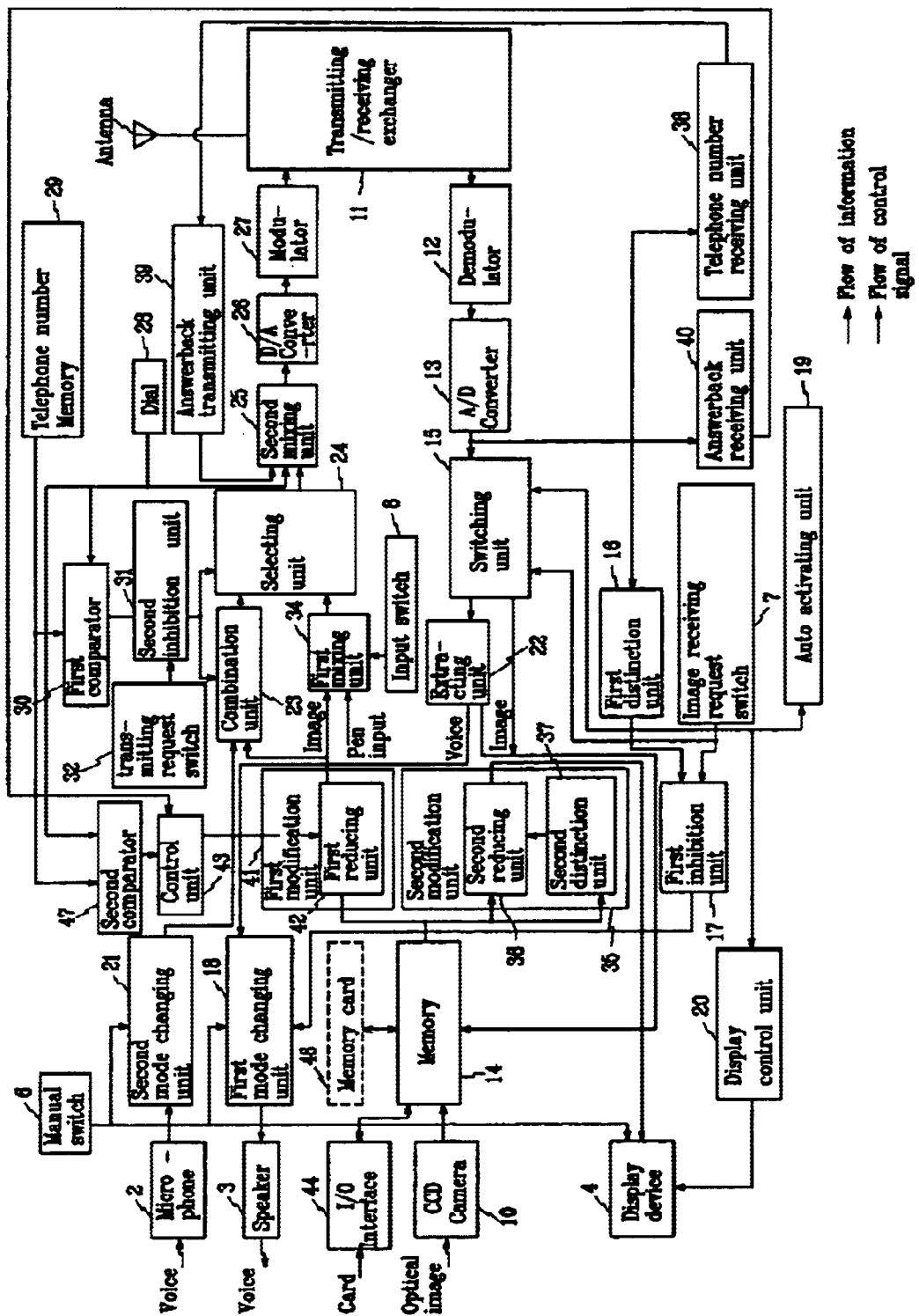
FIG. 2 represents a block diagram showing an embodiment of the digital still camera according to the present invention.

In FIG. 2, a thick line represents the flow of information and a thin line represents the flow of control signals.

In more detail, the digital still camera according to an embodiment of the present invention includes
- a CCD camera 10 for converting an optical image into a digital electronic signal,
- a transmitting/receiving exchanger 11 for receiving or transmitting an electromagnetic signal representing an image,
- a demodulator 12 for demodulating the received electromagnetic signal, which is connected to the output of the transmitting/receiving exchanger 11,
- an A/D converter 13 for converting the electromagnetic signal into a digital electronic image signal,
- a switching unit 15 connected to the output of the A/D converter 13,
- an extracting unit 22 for extracting a still image signal component and a voice signal component from the digital electronic signal,
- a memory 14 for storing the still image signal from the extracting unit 22 or the digital still image signal from the CCD camera 10,
- a speaker 3 for generating an audio signal in response to the electromagnetic signal received by the transmitting/receiving exchanger 11,
- a first mode changing unit 18 for activating the speaker 3 in the first/second mode,
- a first distinction unit 16 for distinguishing a still image signal from the electromagnetic signal containing an audio signal to thereby automatically control the switching unit 15 from a first mode to a second mode,
- a display control unit 20 for controlling the display device 4 to display whether the received electromagnetic signal contains a still image signal or audio signal,
- a first inhibition unit 17 for turning the first mode changing unit 18 "OFF" to restrain the speaker 3 from generating a voice signal in the second mode,
- an image receiving request switch 7 for operating the switching unit 15 from a first mode to a second mode,
- a telephone number receiving unit 38 for receiving a telephone number signal from another remote device, such as another digital still camera or a telephone,
- an answer back receiving unit 40 for receiving a second answer back signal from another remote device, and
- an auto activating unit 19 connected to the output the first distinction unit 16.

In addition to the above-mentioned construction for receiving an electromagnetic signal from the remote device and outputting a corresponding voice signal and displaying a corresponding image, the digital still camera according to an embodiment of the present invention further includes:
- a microphone 2 for converting sound into an electronic audio signall,
- a second mode changing unit 21 for activating the microphone 2 in a first/second mode,
- a first modification unit 41 for forming a still image signal of fewer pixels than the still image signal input from the memory 14,
- a combination unit 23 for combining the electronic audio signal from the second mode changing unit 21 and the still image signal from the first modification unit 41,
- a first mixing unit 34 for mixing the still image signal from the first modification unit 41 and a signal input by pen when an input switch 8 is activated "ON",
- a selecting unit 24 for outputting alternatively one of the signals from the combination unit 23 and from the first mixing unit 34,
- a dial 28 for dialing a telephone number designating another remote device,
- a telephone number memory 29 for storing telephone numbers,
- a first comparator 30 and second comparator 47 for comparing the telephone number dialed by the dial 28 with the telephone number stored in the memory 14,
- a second inhibition unit 31 for inhibiting the combination unit 23 from combining the electronic audio signal from the second close/remote mode exchanger 21 and the still image signal from the first modification unit 41 when the dialed telephone number designating another remote device coincides with the memorized telephone number stored in memory 14,
- a control unit 43 for controlling the first modification unit 41,
- a second modification unit 35 for judging whether the still image signal stored in memory 14 is a first type or a second type,
- an answer back transmitting unit 39 for generating a first answer back signal indicative of receiving an electromagnetic signal transmitted from another remote device,
- a second mixing unit 25 for mixing signals from the selecting unit 24, the answer back transmitting unit 39, and the dial 28,
- a D/A converter 26 for converting the signal from the second mixing unit 25 into an analog signal,
- a modulation unit 27 for modulating the signal from the D/A converter 26 and outputting it to the transmitting/receiving exchanger 11, and
- an image transmitting request switch 32 connected to the input of the second inhibition unit 31.

The first modification unit 41 includes a first reducing unit 42 for reducing the number of pixels of the still image signal input from memory 14. The second modification unit 35 includes a second distinction unit 37 for judging whether the image signal input from the memory 14 is of a first type or a second type, and a second reducing unit 36 for reducing the number of pixels of the image signal input from memory 14 according to the results and outputting the image to the display device 4.

The digital still camera according to an embodiment of the present invention further includes an input/output interface unit 44 for outputting an image signal from a card to the memory 14 and a memory card 46.

The transmitting/receiving exchanger 11 amplifies the transmitted or received electromagnetic signals and transmits the amplified signals.

The following is a summary of the relationship among the sizes of a still image signal processed by the CCD camera 10, the memory 4, and the display device 4. The size i.e., the number of pixels of the still image per frame processed by the CCD camera 10 or the memory 14 is 240,000, which is greater than 60,000 pixels of the still image signal contained in the first type of electromagnetic signal.

The number of pixels of the still image signal per frame processed by the display device 4 is 60,000, which is substantially equal to that of the still image signal contained in the first type of electromagnetic signal.

On the other hand, the number of pixels of the still image signal per one frame processed by the CCD camera 10 is 240,000, which is substantially equal to that of the still image signal contained in the second type of the electromagnetic signal.

One feature of the present invention is that the number of pixels of the still image signal per one frame is reduced from 240,000 to 60,000 pixels when it is transmitted and received only for the purpose of displaying the image on the display device 4 of 60,000 pixels. This saves time necessary for the digital still camera to exchange one frame of a still image signal with the same type of the digital still camera.

The second distinction unit 37 of the first modification unit 35 judges the necessity of reducing the number of pixels by the second reducing unit 36 to control the display device 4 of 60,000 pixels regardless of the size of the still image signal from memory 14, i.e., 240,000 or 60,000 pixels. Thus display device 4 is capable of alternatively displaying a still image of the first type of electromagnetic signal or the second type of electromagnetic signal received from a remote device.

The input/output interface 44 serves as a means for outputting the digital electromagnetic signal from the memory 14, the number of pixels of the still image per frame taken out being 240,000 pixels which is greater than that of the still image signal contained in the first type of the electromagnetic signal, i.e., 60,000 pixels.

The memory card 46 also serves as a means for outputting the digital electronic signal from the memory 14, the number of pixels of the still image per one frame taken out being also 240,000 pixels which is greater than that of the still image signal contained in the first type of electromagnetic signal, i.e., 60,000 pixels. The memory card 46 serves as a memory for storing the still image of 240,000 pixels per frame and is detachably inserted into the digital still camera. In other words, a slot for memory card 46 serves as a means for removing the digital still image memory out of the digital still camera.

Figure 3:
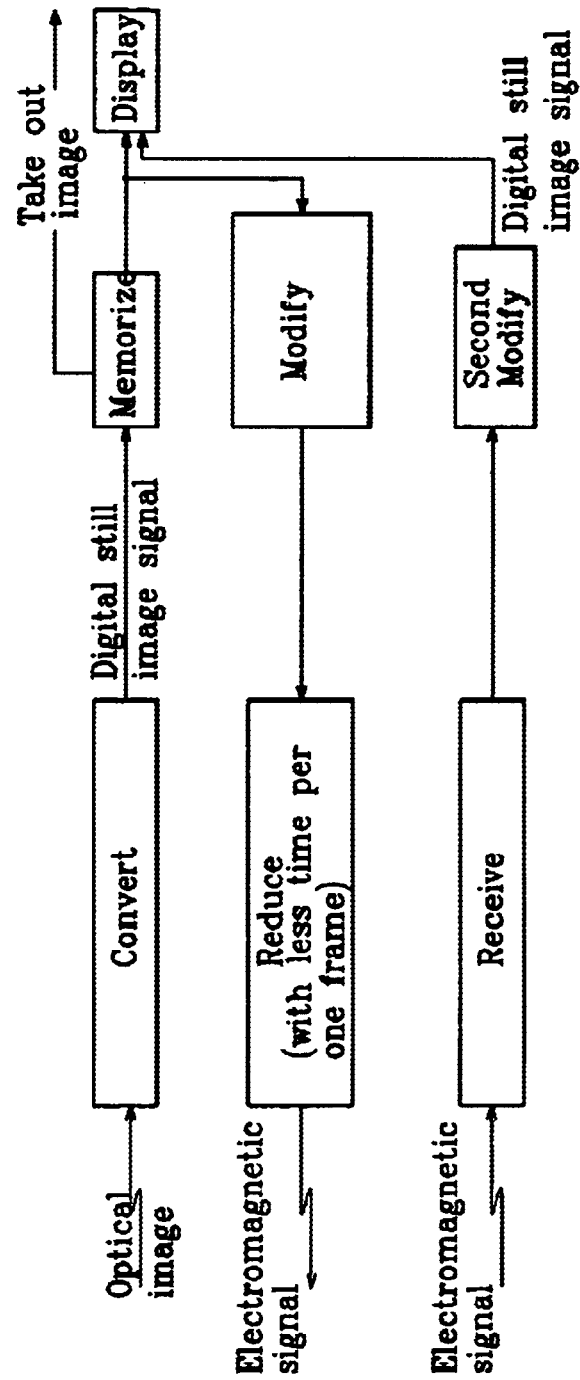
FIG. 3 represents a block diagram showing a transmitting/receiving state of the digital still camera according to an embodiment of the present invention.

The digital still camera according to the embodiment of the present invention, as shown in FIG. 3, converts an optical image into an electronic image signal and reduces a number of pixels of the image signal and forms an electromagnetic signal containing the still image signal and transmits the electromagnetic signal to a designated remote device, such as another digital still camera.

Also, the digital still camera receives an electromagnetic signal containing a still image signal from the remote device and converts the electromagnetic signal into a digital electronic signal and displays a corresponding still image.

Figure 4:
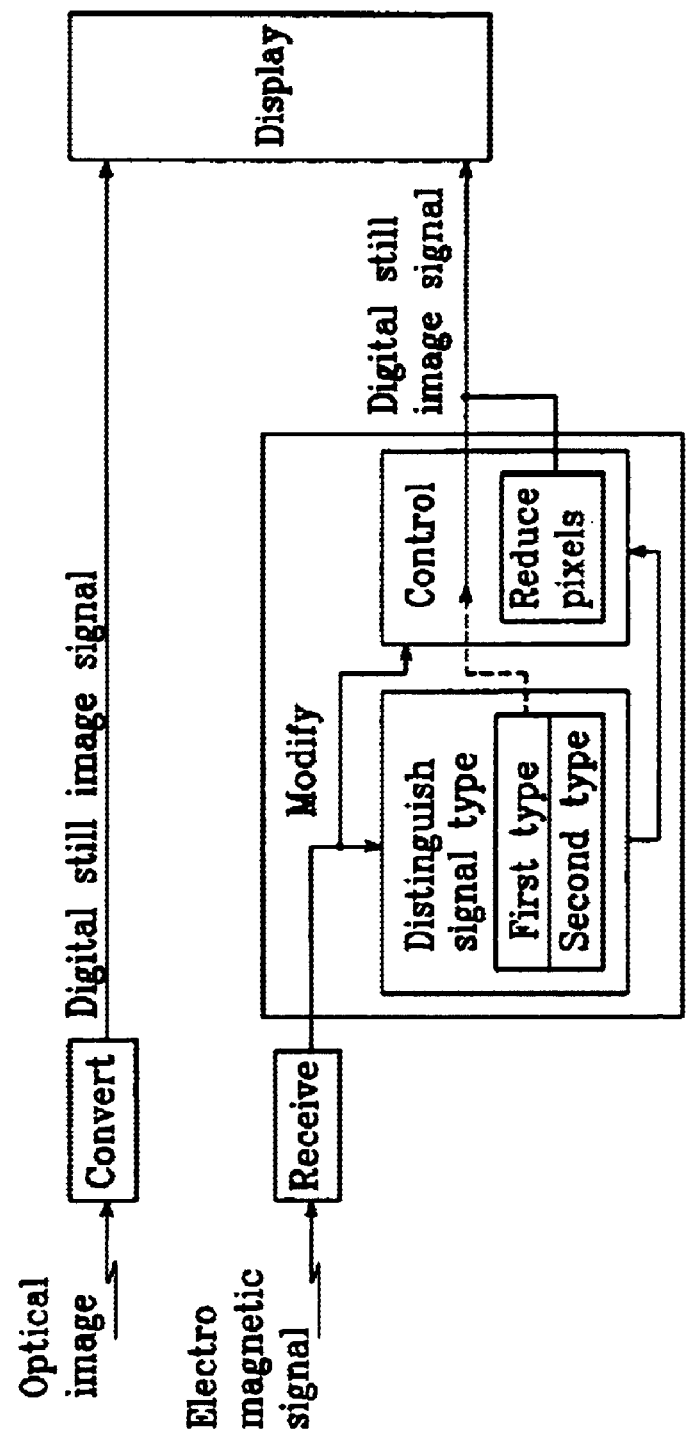
FIG. 4 represents a block diagram showing a transmitting/receiving state of the digital still camera according to another embodiment of the present invention.

Further, the digital still camera according to another embodiment of the present invention, as shown in FIG. 4, controls the number of pixels of the electromagnetic signal containing a still image signal from the remote device according to the type of the electromagnetic signal from the remote device and displays a corresponding still image.

Figure 5:
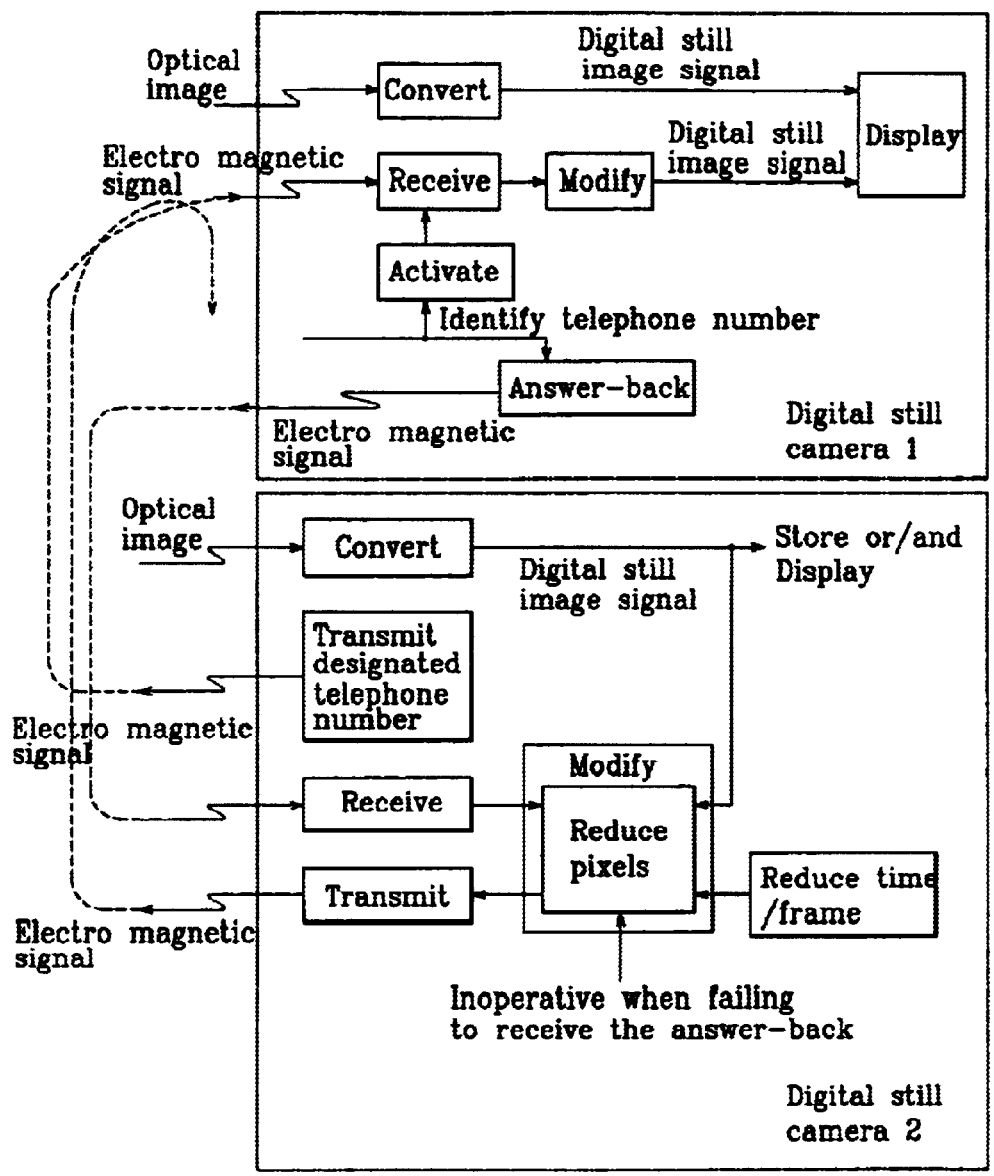
FIG. 5 represents a block diagram showing a transmitting/receiving state of the digital still camera according to another embodiment of the present invention.

Further, the digital still camera capable of telecommunication according to another embodiment of the present invention, as shown in FIG. 5, reduces the number of pixels of an image signal received by a CCD camera and transmits the image to the remote device when an answer back signal is received, and transmits a still image signal received by a CCD camera as it is without reducing the number of pixels when an answer back signal is not received.

The above-mentioned operation of the digital still camera according to embodiments of the present invention will be explained in detail with reference to FIG. 2.

As shown in FIGS. 2 and 3, an antenna of the digital still camera of the present invention receives an electromagnetic signal from another remote device, such as another digital still camera, and a transmitting/receiving exchanger 11 outputs the received electromagnetic signal to a demodulator 12 in a receiving mode.

The demodulator 12 demodulates the electromagnetic signal and an A/D converter 13 converts the demodulated electromagnetic signal into a digital electronic signal.

When a telephone number identifying a digital still camera of the present invention is received by a telephone receiving unit 38 through the transmitting/receiving exchanger 11, the demodulator 12 and the A/D converter 13, as described above, an answer back transmitting unit 39 outputs a first answer back signal identifying the digital still camera and the first answer back signal is transmitted by the transmitting/receiving exchanger 11 through a second mixing unit 25, a D/A converter 26 and a modulator 27.

The first answer back signal indicates that the digital still camera is capable of receiving a first type of electromagnetic signal containing a still image signal of 60,000 pixels per one frame.

The telephone number receiving unit 38 automatically activates the digital still camera of the present invention to receive a transmitted signal responsive to the telephone number as an electromagnetic signal.

The signal from the A/D converter 13 is input to a switching unit 15 and a first distinction unit 16, respectively after the electromagnetic signal containing a still image signal from the remote device is transmitted and is processed, as described above.

The first distinction unit 16 distinguishes a still image signal from the digital electronic signal containing an audio signal to thereby automatically control a switching unit 15 from first mode to second mode and output a corresponding control signal to a first inhibition unit 17.

At this time, a display device 4 indicates with characters or symbols whether the received electromagnetic signal contains a still image or an audio signal.

The switching unit 15 is provided to switch between a first mode and a second mode, the first mode for generating audio by a speaker 3 and the second mode for displaying a still image on a display device 4 responsive to the digital signal received.

The digital still camera according to an embodiment of the present invention is set in automatic mode such that the switching unit 15 is automatically activated from first mode to second mode by the first distinction unit 16 for automatically receiving a transmitted electromagnetic signal containing a still image signal from the remote device.

The auto activating unit 19 is effective in the automatic mode for automatically activating the functions of receiving the electromagnetic signals of a still image in response to the telephone number identifying the digital still camera of the present invention when the first distinction unit 16 distinguishes the electromagnetic signals of a still image.

However, when the digital still camera is set in manual mode such that the switching unit 15 is not automatically activated from first mode to second mode by the first distinction unit 16, the switching unit 15 can be activated from first mode to second mode by a manual request switch 7. Also, in manual mode, the display device 4 can be activated "ON" and first and second mode changing units 21, 18 can be changed from first mode to second mode by a manual switch 6.

The switching unit 15 outputs the digital electronic signal from the A/D converter to a memory 14 in second mode while a first inhibition unit sets a first mode changing unit 18 "OFF" to restrain the speaker 3 from generating an audio signal in the second mode.

The digital electronic signal containing a still image signal input from the switching unit 15 to the memory 14 is output to a display device 4 through a second modification unit 35. A second distinction unit 37 of the second modification unit 35 judges whether the still image signal is of a first type or a second type and outputs a control signal corresponding to a judgment result to a second reducing unit 36. The number of pixels of the displays device 4 is 60,000. In other words, the second distinction unit 37 activates the reducing unit 36 to coincide a number of pixels of the still image signal with that of the display device 4.

When the received still image signal is of a first type, the number of pixels of the received still image signal is equal to that of the display device 4, so that the second distinction unit 37 sets the second reducing unit 36 "OFF". Thus, the received still image signal from the memory 14 is passed through the second reducing unit 36 as it is with the number of pixels not reduced.

On the other hand, when the received still image signal is of a second type, the number of pixels of the received still image signal is greater than that of the display device 4, so that the distinction unit 37 sets the second reducing unit 36 "ON". Thus, the received still image signal from the memory 14 is passed through the second reducing unit 36 with the number of pixels reduced from 240,000 to 60,000.

Accordingly, the display device 4 displays the still image of 60,000 pixels per frame corresponding to the electromagnetic signal containing a still image signal.

An example of talking on the phone while watching an image on display device 4 is the case where a still image is transmitted during audio signal transmission. In this case, a combination of digital electronic signals indicative of a still image and the electronic audio signal is received as an electromagnetic signal.

When an electromagnetic signal containing a still image signal and an audio signal is received, the first distinction unit 16 distinguishes the audio and image signals, thereby setting the switching unit 15 to the first mode and the switching unit 15 outputs the electromagnetic signal to a extracting unit 22.

The extracting unit 22 extracts an audio signal component from the combination signal containing both a still image signal and an audio signal to control a speaker 3 and a still image signal component from the combination signal containing both a still image signal and an audio signal to control a display device 4.

At this time, the first inhibition unit 17 sets the first mode changing unit 18 "ON" and the audio signal extracted from the extracting unit 22 is input to the first mode changing unit 18 and the still image signal extracted from the extracting unit 22 is input to a memory 14. The audio signal is output by a speaker 3 through the first mode changing unit 18, and the still image signal is processed by the modification unit 35 and is displayed on display device 4.

Accordingly, display device 4 is capable of displaying the received still image while the audio signal is generated from the speaker 3, so that the user of the digital still camera can see a still image and hear a voice from a remote device.

Next, an operation wherein a still image signal and a voice signal received by the digital still camera of the present invention is transmitted to another remote device is as follows.

The user of the digital still camera designates a telephone number of a remote device, such as a telephone, by activating a dial 28, which is formed as a touch panel in display device 4. The dialed telephone number is transmitted to a corresponding remote device by transmitting/receiving exchanger 11 through a second mixing unit 25, D/A converter 26 and a modulator 27 as an electromagnetic signal.

The D/A converter 26 converts a digital signal corresponding to a dialed telephone number into an analog signal and the modulator 27 modulates the analog signal, so that the modulated signal is transmitted to a corresponding remote device by the transmitting/receiving exchanger 11 as an electromagnetic signal. The dialed telephone number is also input to a first comparator 30 and a second comparator 47.

When the user of the digital still camera speaks into the microphone 2, the speech is converted into an electronic audio signal by a microphone 2 and is input to a second mode changing unit 21. The second mode changing unit 21 outputs the electronic audio signal to a combination unit 23 and the electronic voice signal is transmitted by the transmitting/receiving exchanger 11 through the D/A converter 26 and the modulator 27.

The combination unit 23 is capable of combining a digital still image signal received by a CCD camera while the audio signal is transmitted, so that the audio signal and the still image signal can be transmitted at the same time.

First, a still image signal received by a CCD camera is stored in a memory 14 and the stored still image signal is outputted to a first modification unit 41.

The still image signal input to the first modification unit 41 is output to a combination unit 23 and the combination unit 23 combines and outputs an inputted voice signal with an inputted still image signal according to a control signal from a second inhibiting unit 31.

The first comparator 30 compares the dialed telephone number with a telephone number stored in a telephone number memory 29 and outputs a comparison result to a second inhibition unit 31.

The phone number memory 29 is further capable of storing at least one first telephone number of a remote device not capable of receiving a still image, and at least one second telephone number of a remote device having a function capable of receiving a still image.

The second inhibition unit 31 inhibits the combining unit 23 from combining the electronic audio signal with a digital still image signal from a first modification unit 41 when the dialed telephone number designating a remote device coincides with the stored first telephone number in the telephone number memory 29. In this case, the second inhibition unit 31 controls a selecting unit 24 so as not to select and output a still image signal.

On the contrary, the second inhibition unit 31 allows the combining unit 23 to combine the electronic voice signal with a digital still image signal from a first modification unit 41 when the dialed telephone number designating a remote device coincides with the stored second telephone number in the telephone number memory 29. In this case, the second inhibition unit 31 controls a selecting unit 24 so as to select and output a still image signal.

Thus, the combination of the electromagnetic signal containing the still image is allowed when the dialed telephone number coincides with the specific telephone number of the remote device having a function capable of receiving a still image signal.

However, the second inhibition unit 31 controls the combination 23 to combine an audio signal with a still image signal when an image transmitting request switch 32 is activated.

Accordingly, only when the image transmitting request switch 32 is activated and the dialed telephone number coincides with the second telephone number, the combination of the electromagnetic signal containing the still image is allowed.

The combination signal of combining an audio signal from the microphone 2 with a still image signal received by a CCD camera is transmitted to another remote device capable of receiving a still image signal through D/A converter 26, the modulator 27, and the transmitting/receiving exchanger 11.

The selecting unit 24 selects one of the digital electronic signals indicative of the still image and the electronic audio signal, the voice signal being in some cases combined with a still image signal by the combining unit 23. In other words, the selecting unit 24 selects one of the signals from the combining unit 23 and the first mixing unit 34 and outputs it to a D/A converter 26.

The still image signal input to the combination unit 23 and the second mixing unit 34 is processed by a first modification unit 41 as follows.

A second answer back signal from a corresponding remote device is transmitted according to a transmission of the dialed telephone number. An answer back receiving unit 40 receives the second answer back signal and outputs it to control unit 43.

The second answer back signal identifies a remote device of a specific type prepared for receiving the first type of the electromagnetic signal containing a still image signal of 60,000 pixels per frame.

At the result of the identification of the digital still camera at phone number receiving unit 38 and the transmission of the answer back signal by the answer back unit 39, another digital still camera transmitting the identifying electromagnetic signal will further transmit the first type of electromagnetic signal containing a still image signal of 60,000 pixels per frame in less time than that necessary for a still image signal of 240,000 pixels per frame.

The control unit 43 activates a first modification unit 41 to reduce the number of pixels of a still image signal from the memory 14 when the second answer back signal is transmitted by the answer back receiving unit 40.

The first reducing unit 42 reduces the number of pixels of the still image from memory 14 to form a still image signal of fewer pixels to be contained in the transmitted electromagnetic signal and further reduces the time of transmitting one frame of the still image signal by reducing the number of pixels. In other words, a still image signal of 240,000 pixels at memory 14 is modified into a still image signal of 60,000 pixels per frame with a shorter transmission time. Regarding reduction of the number of pixels of an image, the following prior art may be employed. The first reducing unit 42 and the second reducing unit 36 are programmed by software. When loading 240,000 pixels (100×100) of the image data stored in the memory 14, either the odd addresses can be loaded or the even addresses can be loaded, whereby the number of pixels of an image data is reduced by 60,000 pixels (50×50).

The first reducing unit 42 is inoperative when the answer back receiving unit 40 fails to receive the second answer back signal transmitted from the designated remote device, whereby the first modification unit 41 forms a still image signal to be contained in the electromagnetic signal without reducing the number of pixels of the still image signal from memory 14. In other words, a still image signal of 240,000 pixels is transmitted to the another remote device regarded as a type not prepared for receiving the first type of the electromagnetic signal containing a still image signal.

The still image signal from the first reducing unit 42 is output to a first mixing unit 34, and the first mixing unit mixes the still image signal with a pen input signal according to an operation of switch 8, so that the still image signal mixed with the pen input signal is transmitted to another digital still camera by the transmitting/receiving exchanger 11 through a second mixing unit 25, a D/A converter 26, and a modulation unit 27.

As mentioned above, the number of pixels of a still image signal to be transmitted is reduced or is not reduced according to an image signal processing capacity of a remote device which the still image signal from a CCD camera or an input/output interface 44 or memory card 46 will be transmitted, and the number of pixels of a still image signal is reduced or is not reduced according to an image signal processing capacity of a digital still camera receiving the still image signal from a remote device, thus the digital still camera can communicate with another remote device, such as another CCD camera or computer.

As described above, the present invention, in accordance with the embodiment, provide a digital still camera capable of telecommunication including in one inseparable housing a wireless handy phone, which can receive and display a digital electronic signal indicative of a still image taken by another digital still camera.

Also, the present invention provides a digital still camera which can suitably receive the audio signal and the image signal without any confusion and a user can talk not only in the ordinary manner, but also with the displayed still image being watched.

Also, the present invention provides a digital still camera which can communicate both the audio signal and the image signal at the same time and can communicate with various types of telephones including one having no function of receiving an image signal and can communicate with the same type of digital still camera.

While it has been shown and described what are at present the embodiments of the invention, it will be obvious to those skilled in the art that various changes and modification can be readily made without departing from the scope and sprit of the invention as defined by the appended claims.

What is claimed is:

1. A digital still camera comprising:
   means for converting an optical image into a digital image signal;
   transmitting means for transmitting an electromagnetic signal to a designated remote device accessible in accordance with a wireless telephone system, the electromagnetic signal containing a still image represented by the digital image signal;
   storing means for storing the digital image signal input from the means for converting, the number of pixels of the still image in the storing means being greater than that of the still image signal represented by the electromagnetic signal;

means for receiving from said remote device an identification signal transmitted back in response to the designation of said remote device;

modifying means for modifying the electromagnetic signal into a digital image signal;

reducing means for reducing the number of pixels of the still image represented by said digital electronic image signal in the storing means prior to transmission and in response to the identification signal such that the remaining digital image signal has the same number of pixels as that of the still image signal represented by the electromagnetic signal; and means for receiving the electromagnetic signal at the designated remote device.

2. The digital still camera of claim 1, wherein the reducing means is inoperative when the receiving means fails to receive the identification signal transmitted from the remote device, whereby the modifying means forms a digital image signal without reducing the number of pixels of the still image.

3. The digital still camera of claim 1, wherein the reducing means further reduces the time of transmitting one frame of the image.

4. A digital still camera comprising:

converting means for converting an optical image into a digital electronic image signal;

storing means for storing the digital electronic image signal input from the converting means, the number of pixels of a still image in the storing means being greater than that of a still image signal represented by an electromagnetic signal;

extracting means for extracting portions of the digital electronic image signal in the storing means such that the remaining digital image signal has the same number of pixels as that of the still image signal represented by the electromagnetic signal;

receiving means for receiving the electromagnetic signal;

modifying means for modifying the electromagnetic signal into a digital electronic image signal;

displaying means for alternatively displaying a still image on the basis of the digital electronic image signal from the converting means or from the modifying means; and controlling means for controlling said displaying means in a first mode in response to a first type of said electromagnetic signal and in a second mode in response to a second type of said electromagnetic signal.

5. The digital still camera of claim 4, wherein the first type of said electromagnetic signal represents a still image having fewer pixels than a still image represented by the second type of said electromagnetic signal.

6. The digital still camera of claim 5, wherein the time required to transmit one frame of the still image represented by the first type of said electromagnetic signal is shorter than the time required to transmit one frame of the still image represented by the second type of said electromagnetic signal.

7. The digital still camera of claim 5, wherein the controlling means includes means for reducing the number of pixels of the still image signal in the second mode.

8. The digital still camera of claim 7, wherein the displaying means comprises fewer pixels than the still image represented by the second type of said electromagnetic signal.

9. The digital still camera of claim 8, wherein the displaying means comprises the same number of pixels as the first type of electromagnetic signal.

10. The digital still camera of claim 4, further comprising distinguishing means for distinguishing the first type of electromagnetic signal from the second type of electromagnetic signal and means responsive to the distinguishing means for switching the controlling means between the first mode and the second mode.

11. A digital still camera comprising:

converting means for converting an optical image into a digital electronic image signal;

modifying means for modifying an electromagnetic signal into a digital electronic image signal in accordance with a wireless telephone system;

reducing means for reducing the number of pixels of a still image prior to transmission;

storing means for storing the digital electronic signal input from the converting means, the number of pixels of the still image in the storing means being greater than that of the still image signal represented by the electromagnetic signal;

extracting means for extracting portions of the digital electronic image signal in the storing means such that the remaining digital image signal has the same number of pixels as that of the still image signal represented by the electromagnetic signal; and transmitting means for transmitting the electromagnetic signal representing the still image signal of fewer pixels.

12. The digital still camera of claim 11, wherein the extracting means includes means for removing the storing means from the digital still camera.

13. The digital still camera of claim 12, wherein the extracting means further includes means for connecting a card leading to an external device.

14. The digital still camera of claim 11, further comprising displaying means for displaying a still image on the basis of the digital electronic image signal from the converting means, the number of pixels of the displaying means being substantially equal to that of the still image signal represented by the electromagnetic signal.

15. The digital still camera of claim 14, further comprising means for receiving an electromagnetic signal and second means for modifying the received electromagnetic signal into a digital electronic image signal indicative of a still image, wherein the displaying means is capable of alternatively displaying the still image on the basis of the digital electronic image signal from the converting means or from the second modifying means.

16. The digital still camera of claim 15, wherein the number of pixels of the still image from the second modifying means is substantially equal to that of the still image displayed by the displaying means.

17. The digital camera of claim 11, further comprising:

a means for receiving audio input;

a means for transmitting the audio input as part of the electromagnetic signal; and a means for converting the audio input as part of the electromagnetic signal back into an audio output.

* * * * *